United States Patent
Singh et al.

(10) Patent No.: US 9,688,906 B2
(45) Date of Patent: Jun. 27, 2017

(54) BORONATED BIOPOLYMER CROSSLINKING AGENTS AND METHODS RELATING THERETO

(71) Applicant: Halliburton Energy Services, Inc., Houston, TX (US)

(72) Inventors: Dipti Singh, Houston, TX (US); Jeremy Holtsclaw, Houston, TX (US); B. Raghava Reddy, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/362,605

(22) PCT Filed: Jan. 23, 2014

(86) PCT No.: PCT/US2014/012769
§ 371 (c)(1),
(2) Date: Jun. 4, 2014

(87) PCT Pub. No.: WO2015/002669
PCT Pub. Date: Jan. 8, 2015

(65) Prior Publication Data
US 2015/0075789 A1    Mar. 19, 2015

(30) Foreign Application Priority Data

Jul. 1, 2013 (IN) .......................... 1942/DEL/2013

(51) Int. Cl.
*C09K 8/68* (2006.01)
*E21B 43/04* (2006.01)
(Continued)

(52) U.S. Cl.
CPC ............... *C09K 8/685* (2013.01); *C09K 8/06* (2013.01); *C09K 8/725* (2013.01); *C09K 8/882* (2013.01);
(Continued)

(58) Field of Classification Search
CPC ....................................................... C09K 8/65
(Continued)

(56) References Cited

U.S. PATENT DOCUMENTS 3,755,175 A * 8/1973 Clark ....................... C10M 3/00
                                                        252/389.41
5,905,061 A   5/1999 Patel
(Continued)

FOREIGN PATENT DOCUMENTS

WO   WO 2013/168136   * 11/2013 ................ C08L 5/00
WO   WO2013168136     * 11/2013 ............ C08L 101/02

OTHER PUBLICATIONS

Controlling Deposition and Release of Polyol-Stabilized Latex on Boronic Acid-Derivatized Cellulose, Langmuir 2010, 26, 17237-17241.

(Continued)

*Primary Examiner* — Angela M DiTrani
*Assistant Examiner* — Andrew H Sue-Ako
(74) *Attorney, Agent, or Firm* — McDermott Will & Emery LLP

(57) ABSTRACT

Boronated biopolymer crosslinking agents useful in producing viscosified treatment fluids that include an aqueous fluid, a base polymer, and the boronated biopolymer crosslinking agent, wherein the boronated biopolymer crosslinking agent comprises a biopolymer derivatized with a boronic acid, a boronate ester, or both. Such viscosified treatment fluids may be useful in fracturing operations, gravel packing operations, drilling operations, and the like.

15 Claims, 3 Drawing Sheets

(51) Int. Cl.
    *E21B 43/26*     (2006.01)
    *C09K 8/72*     (2006.01)
    *C09K 8/88*     (2006.01)
    *C09K 8/90*     (2006.01)
    *C09K 8/06*     (2006.01)

(52) U.S. Cl.
    CPC ............... *C09K 8/887* (2013.01); *C09K 8/90* (2013.01); *E21B 43/04* (2013.01); *E21B 43/26* (2013.01)

(58) Field of Classification Search
    USPC .................................. 507/215, 273; 166/278
    See application file for complete search history.

(56) References Cited

U.S. PATENT DOCUMENTS

| | | | |
|---|---|---|---|
| 5,977,031 | A | 11/1999 | Patel |
| 6,828,279 | B2 | 12/2004 | Patel et al. |
| 7,534,745 | B2 | 5/2009 | Taylor et al. |
| 7,645,723 | B2 | 1/2010 | Kirsner et al. |
| 7,696,131 | B2 | 4/2010 | Oyler et al. |
| 8,424,603 | B2 | 4/2013 | Loveless et al. |
| 2006/0003900 | A1* | 1/2006 | Hanes, Jr. ............ C09K 8/685 507/203 |
| 2009/0075845 | A1* | 3/2009 | Abad ..................... C09K 8/12 507/117 |
| 2009/0181865 | A1 | 7/2009 | Dessinges et al. |
| 2010/0099586 | A1 | 4/2010 | De Benedictis et al. |
| 2010/0179076 | A1 | 7/2010 | Sullivan et al. |
| 2010/0197528 | A1* | 8/2010 | Sanders ................. C09K 8/58 507/207 |
| 2011/0220358 | A1* | 9/2011 | Robinson .............. B01D 15/00 166/301 |
| 2011/0272325 | A1* | 11/2011 | Soane ................... C09K 8/524 208/14 |
| 2012/0004148 | A1* | 1/2012 | Ogle ....................... C09K 8/12 507/213 |
| 2012/0247768 | A1* | 10/2012 | Ballard ................. C09K 8/035 166/294 |
| 2013/0130947 | A1 | 5/2013 | Brannon et al. |
| 2013/0312970 | A1* | 11/2013 | Lafitte ................... A61K 8/022 166/305.1 |
| 2014/0155305 | A1* | 6/2014 | Hartshorne ........... C09K 8/887 507/211 |
| 2014/0364343 | A1* | 12/2014 | Nelson .................. C09K 8/685 507/211 |

OTHER PUBLICATIONS

Synthesis of Cellulose Derivatives Containing Dihydroxyboryl Group and Their Capacity to Form Complexes with Sugars and Nucleic Acid Components, Biochemistry, 1970, 9, 4396-4401.
International Search Report and Written Opinion for PCT/US2014/012769 dated May 9, 2014.

* cited by examiner

BORONATED BIOPOLYMER CROSSLINKING AGENTS AND METHODS RELATING THERETO

BACKGROUND

The present invention relates to boronated biopolymer crosslinking agents for use in viscosifying treatment fluids and methods relating thereto.

Viscosified treatment fluids are used in many subterranean operations. For example, in fracturing and gravel packing operations, viscosified treatment fluids may be used to suspend and transport particulates to a desired location in a wellbore penetrating the subterranean formation and/or the subterranean formation, so as to form a particulate pack therein (e.g., a proppant pack or a gravel pack). In other instances, viscosified treatment fluids may act to transfer hydraulic pressure in a fracturing operation or to prevent undesired leak-off of fluids into the subterranean formation in a variety of subterranean operations. In many instances, during or after the operation the viscosified treatment fluid is broken (i.e., treated to reduce the viscosity of the treatment fluid) so that the fluid may be more effectively and efficiently removed from the wellbore or formation.

In many instances, viscosified treatment fluids include a base polymer compound that is crosslinked with a crosslinking agent. Common crosslinking agents include metals like boron, aluminum, zirconium, and titanium. However, zirconium and titanium-containing crosslinking agents are used to a lesser degree because of their cost and their crosslinking strength makes the crosslinked fluids difficult to break. Boron-containing crosslinking agents, on the other hand, are more widely available. However, viscosified fluids using boron-containing crosslinking agents are more susceptible to shear thinning wherein the viscosity of the treatment fluid reduces when the fluid is placed under shear. Reduced viscosity can lead to particulate settling in undesired locations, a depressed maximum hydraulic pressure transfer capability, fluids leaking-off into the formation, and the like. To overcome this propensity, boron crosslinking agents typically are added in excess of the stoichiometric amount required to crosslink the treatment fluids, which may increase the environmental footprint and the costs associated with the treatment fluid.

SUMMARY OF THE INVENTION

The present invention relates to boronated biopolymer crosslinking agents for use in viscosifying treatment fluids and methods relating thereto.

One embodiment of the present invention provides for a method that includes introducing a viscosified treatment fluid into a wellbore penetrating a subterranean formation, the viscosified treatment fluid comprising an aqueous fluid, a base polymer, and a boronated biopolymer crosslinking agent, wherein the boronated biopolymer crosslinking agent comprises a biopolymer derivatized with a boronic acid, a boronate ester, or both.

Another embodiment of the present invention provides for a method that includes introducing a first treatment fluid into a wellbore penetrating a subterranean formation at a pressure sufficient to create or extend at least one fracture in the subterranean formation; and forming a particulate pack in the fracture with a second treatment fluid that comprises an aqueous fluid, a base polymer, a boronated biopolymer crosslinking agent, and a plurality of particulates, wherein the boronated biopolymer crosslinking agent comprises a biopolymer derivatized with a boronic acid, a boronate ester, or both.

Yet another embodiment of the present invention provides for a viscosified treatment fluid that includes an aqueous fluid, a base polymer, and a boronated biopolymer crosslinking agent, wherein the boronated biopolymer crosslinking agent comprises a biopolymer derivatized with a boronic acid, a boronate ester, or both.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
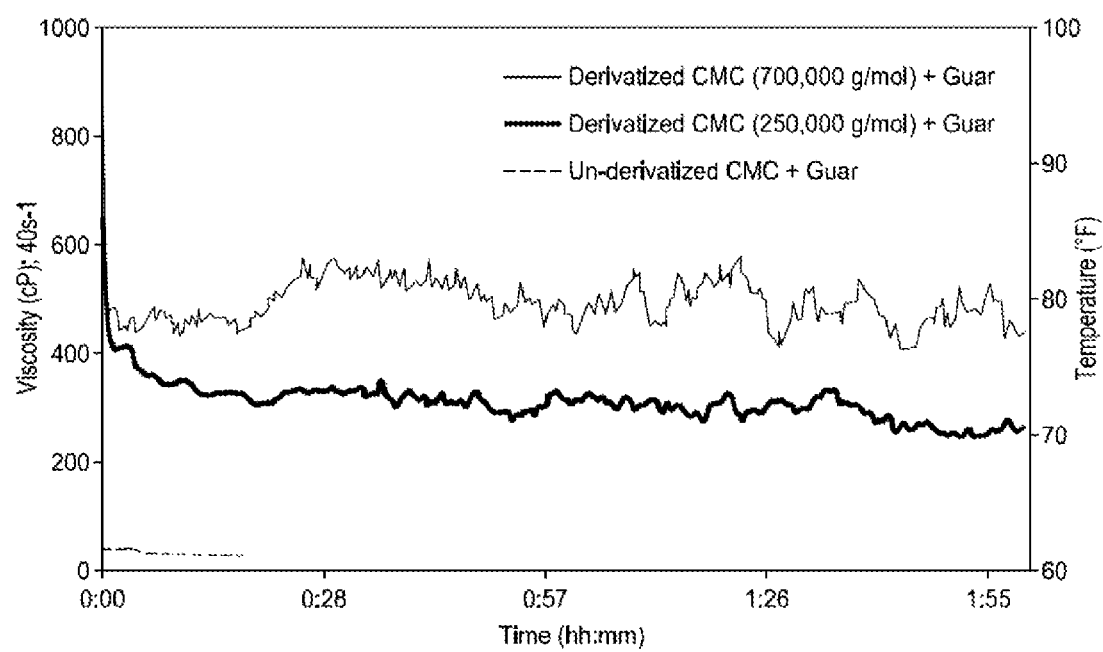
FIG. 1 is a viscosity profile of viscosified treatment fluids described herein and a control treatment fluid.

The present invention relates to boronated biopolymer crosslinking agents for use in viscosifying treatment fluids and methods relating thereto.

As used herein, the terms "boronated biopolymer crosslinking agents" (referred to herein as "BB crosslinking agents") refer to crosslinking agents that comprise a biopolymer derivatized with (1) a boronic acid, (2) a boronate ester, or (3) both, examples of which are provided herein. As used herein, the term "biopolymer" refers to a polymer produced in a living organism (e.g., a plant or a microorganism such as bacteria) or a derivative thereof (including a biopolymer having been synthetically derivatized).

The BB crosslinking agents described herein advantageously have polymeric molecules containing multiple boron-containing groups available for crosslinking a base polymer, which may reduce shear thinning of the viscosified treatment fluid, thereby yield a more effective treatment fluid. Further, because the BB crosslinking agents described herein are based on biopolymers, the BB crosslinking agents may be readily degraded (e.g., with acids), thereby allowing for a straight-forward avenue for breaking the viscosified treatment fluid. Therefore, the viscosified treatment fluids described herein may have enhanced stability under shear and still be readily broken.

Additionally, the use of a polymeric crosslinking agent provides for more sites of crosslinking in a single crosslinking agent molecule, which, in turn, may allow for achieving the same level of viscosification with less of the base polymer and the BB crosslinking agents, which reduces costs. This may be especially advantageous in systems where the base polymer has become less available and/or more costly (e.g., guar) and the BB crosslinking agent is derived from a readily available biopolymer (e.g., cellulose or a cellulose derivative). Such a system may synergistically reduce costs while enhancing performance of the viscosified treatment fluid.

It should be noted that when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

In some embodiments, a viscosified treatment fluid described herein may comprise an aqueous fluid, a base polymer, and a BB crosslinking agent that itself comprises a biopolymer derivatized with a boronic acid, a boronate ester, or both. As used herein, the term "derivatized" or grammatical equivalents thereof encompasses both covalent bonding, ionic interactions, and other suitable atomic interactions as would be apparent to one of ordinary skill in the art.

Suitable aqueous fluids may comprise fresh water, saltwater (e.g., water containing one or more salts dissolved therein), brine (e.g., saturated salt water), seawater, and any combination thereof. Generally, the water may be from any source, provided that it does not contain components that might adversely affect the stability and/or performance of the BB crosslinking agent or viscosified treatment fluid. In certain embodiments, the density of the aqueous fluid can be adjusted, among other purposes, to provide additional particulate transport and suspension in the viscosified treatment fluids used in the methods of the present invention. In some embodiments, the pH range of the aqueous fluid may preferably be from about 4 to about 11. One of ordinary skill in the art, with the benefit of this disclosure, will recognize when density and/or pH adjustments are appropriate.

In some instances, the aqueous fluid may further comprise an aqueous-miscible fluid. Suitable aqueous-miscible fluids may, in some embodiments, include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), and any combination thereof.

In some instances, the aqueous fluid (optionally comprising an aqueous-miscible fluid) may be a portion of an emulsion having an aqueous continuous phase and an oleaginous discontinuous phase or invert emulsion having an oleaginous continuous phase and an aqueous discontinuous phase, wherein the base polymer and BB crosslinking agent are within the aqueous phase. A suitable oleaginous phase may include any oleaginous continuous phase fluid suitable for use in subterranean operations. By way of nonlimiting example, an oleaginous phase may include an alkane, an olefin, an aromatic organic compound, a cyclic alkane, a paraffin, a diesel fluid, a mineral oil, a desulfurized hydrogenated kerosene, and any combination thereof. Suitable invert emulsions may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the treatment fluid, where the amount may range from any lower limit to any upper limit and encompass any subset there between. Examples of suitable invert emulsions include those disclosed in U.S. Pat. No. 5,905,061 entitled "Invert Emulsion Fluids Suitable for Drilling" filed on May 23, 1997, U.S. Pat. No. 5,977,031 entitled "Ester Based Invert Emulsion Drilling Fluids and Muds Having Negative Alkalinity" filed on Aug. 8, 1998, U.S. Pat. No. 6,828,279 entitled "Biodegradable Surfactant for Invert Emulsion Drilling Fluid" filed on Aug. 10, 2001, U.S. Pat. No. 7,534,745 entitled "Gelled Invert Emulsion Compositions Comprising Polyvalent Metal Salts of an Organophosphonic Acid Ester or an Organophosphinic Acid and Methods of Use and Manufacture" filed on May 5, 2004, U.S. Pat. No. 7,645,723 entitled "Method of Drilling Using Invert Emulsion Drilling Fluids" filed on Aug. 15, 2007, and U.S. Pat. No. 7,696,131 entitled "Diesel Oil-Based Invert Emulsion Drilling Fluids and Methods of Drilling Boreholes" filed on Jul. 5, 2007, each of which are incorporated herein by reference in their entirety.

Base polymers may be natural polymers or synthetic polymers capable of being crosslinked by boric acid. Examples of natural base polymers may include, but are not limited to, guar, a guar derivative, hydroxypropylguar, oxidized guar, carboxymethylhydroxypropylguar, carboxymethyl guar, hydrophobically modified guar derivative, locust bean gum, a locust bean gum derivative, fenugreek gum, a fenugreek gum derivative, tara gum, a tara gum derivative, and the like, and any combination thereof. Examples of synthetic base polymers may include, but are not limited to, polyols, polyvinyl alcohols, polymers comprising a monomer having a 1,4 diol substitution, polymers comprising a monomer having a 1,3 diol substitution, polymers comprising a monomer having a 1,2 diol substitution, and the like, and any combination thereof.

Suitable base polymers may have a molecular weight ranging from a lower limit of about 100,000 g/mol, 250,000 g/mol, 500,000 g/mol, or 1,000,000 g/mol to an upper limit of about 5,000,000 g/mol, 2,500,000 g/mol, 1,000,000 g/mol, or 750,000 g/mol, and wherein the molecular weight may range from any lower limit to any upper limit and encompasses any subset therebetween.

In some embodiments, the viscosified treatment fluids described herein may comprise the base polymers at a concentration ranging from a lower limit of about 0.1%, 0.5%, or 1% by weight of the treatment fluid to an upper limit of about 10%, 5%, or 1% by weight of the treatment fluid, and wherein the amount may range from any lower limit to any upper limit and encompasses any subset therebetween. In some embodiments, the viscosified treatment fluids described herein that comprises a BB crosslinking agent may have a base polymer concentration about 25% to about 50% lower than a commensurate viscosified treatment fluid having the same viscosity and comprising the base polymer and a traditional boron-containing crosslinking agent (e.g., a molecular boron-containing crosslinking agent like versus the sodium pentaborate as compared to a polymeric boron-containing crosslinking agent like the BB crosslinking agents described herein).

Suitable BB crosslinking agents may comprise a biopolymer derivatized with a boronic acid or a boronate ester. Examples of biopolymers suitable for derivatization may include, but are not limited to, a guar gum, oxidized guar, hydroxyethyl guar, hydroxypropyl guar, carboxymethyl guar, carboxymethylhydroxyethyl guar, carboxymethylhydroxypropyl guar, a cellulose, a cellulose derivative selected from hydroxyethyl cellulose, carboxyethylcellulose, carboxymethylcellulose, carboxymethylhydroxyethylcellulose, methyl cellulose, ethylcellulose, methylhydroxyethyl cellulose, xanthan, scleroglucan, succinoglycan, diutan, an alginate, a pectinate, chitosan, a hyaluronic acid, a polysaccharide, a polypeptide, and the like, and any combination thereof.

In some cases, the biopolymer that is derivatized with a boronic acid or a boronate ester selected base polymer may be identical to the selected base polymer. In other cases it may be desirable to have the selected base polymer be different from the biopolymer. In some embodiments, the base polymer is preferably a biopolymer, but may be different form the selected derivatized biopolymer of the BB crosslinking agent.

Suitable BB crosslinking agents may have a molecular weight ranging from a lower limit of about 1,000 g/mol, 10,000 g/mol, 100,000 g/mol 250,000 g/mol, 500,000 g/mol, or 1,000,000 g/mol to an upper limit of about 5,000,000 g/mol, 2,500,000 g/mol, 1,000,000 g/mol, 750,000 g/mol, or 500,000 g/mol, and wherein the molecular weight may range from any lower limit to any upper limit and encompasses any subset therebetween.

Suitable boronic acids or boronate esters for derivatizing a biopolymer may include, but are not limited to, boronic acid comprising an alkylene, alkenyl, aryl, aralkyl, alkylaryl, alicyclic, or heteroaryl group, that comprises a functional group capable of reacting with a functional group of the biopolymer. Formula I provides a general structure of a boronic acid or boronate ester suitable for derivatizing a biopolymer, wherein R may be an alkylene, alkenyl, aryl, aralkyl, alkylaryl, alicyclic, or heteroaryl group containing 1 to 12 carbons, X may be a functional group capable of reacting with a functional group of the biopolymer (e.g., amine, alcohol, carboxylic acid, toluene sulfonate, methane sulfonate, halide, cyano, and the like), and $R_1$ and $R_2$ may independently be H or alkylene, alkenyl, aryl, aralkyl, alkylaryl, alicyclic, or heteroaryl groups containing 1 to 12 carbons.

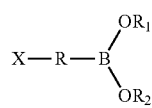
Formula I

Examples of boronic acids or boronate esters suitable for functionalizing a biopolymer to yield a BB crosslinking agent described herein may include, but are not limited to, bromopentyl boronic acid, chloromethylvinyl boronic acid, 4-cyanopheylboronic acid, aminophenyl boronic acid and its salts with mineral or organic acid, esters with pinacol, formylphenyl bornic acids, carboxyphenyl borornic acids, bromomethyl boronic acid, alkoxycarbonyl bornic acids, boronate esters such as bromopropyl ester, formylphenyl boronic acid pinacol ester, and the like, and any combination thereof.

In some embodiments, the BB crosslinking agents described herein may have a boron weight percent ranging from a lower limit of about 0.005%, 0.01%, or 0.05% to an upper limit of about 0.05%, 0.1%, or 0.5%, and wherein the boron weight percent may range from any lower limit to any upper limit and encompasses any subset therebetween.

In some embodiments, the BB crosslinking agents described herein may have molar ratio of boron to monomeric units in the biopolymer ranging from a lower limit of about 1:20, 1:10, or 1:5 to an upper limit of about 1:1, 1:2, or 1:5, and wherein the molar ratio may range from any lower limit to any upper limit and encompasses any subset therebetween.

In some embodiments, the viscosified treatment fluids described herein may comprise the BB crosslinking agents at a concentration ranging from a lower limit of about 0.005%, 0.01%, or 0.05% by weight of the treatment fluid to an upper limit of about 5%, 2%, 1%, or 0.5% by weight of the treatment fluid, and wherein the amount may range from any lower limit to any upper limit and encompasses any subset therebetween.

By way of nonlimiting example, in some embodiments, a viscosified treatment fluid described herein may comprise an aqueous base fluid, a base polymer that comprises guar, and a BB crosslinking agent that comprises carboxymethylcellulose derivatized with aminophenyl boronic acid.

In some embodiments, the viscosified treatment fluids described herein may optionally further comprise a plurality of particulates. It should be understood that the term "particulate," as used in this disclosure, includes all known shapes of materials, including substantially spherical materials, fibrous materials, polygonal materials (such as cubic materials), and any combination thereof.

Suitable particulates for use in conjunction with the fluids and methods described herein may comprise any material suitable for use in subterranean operations. Suitable materials for these particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, glass and mineral fibers, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, organophilic clay, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh.

In some embodiments, the particulates may be present in the viscosified treatment fluids in an amount in the ranging from a lower limit of about 0.5 pounds per gallon ("ppg"), 1 ppg, or 5 ppg by volume of the treatment fluid to an upper limit of about 30 ppg, 20 ppg, or 10 ppg by volume of the treatment fluid, and wherein the amount may range from any lower limit to any upper limit and encompasses any subset therebetween.

In some embodiments, the viscosified treatment fluids described herein may optionally further comprise additives. Suitable additives may include, but are not limited to, weighting agents, inert solids, fluid loss control agents, emulsifiers, demulsifiers, oxygen scavengers, dispersion aids, corrosion inhibitors, emulsion thinners, emulsion thickeners, surfactants, lost circulation materials, foaming agents, gases, pH control additives, breakers, biocides, stabilizers, chelating agents, scale inhibitors, gas hydrate inhibitors, mutual solvents, oxidizers, reducers, friction reducers, clay stabilizing agents, and the like, and any combination thereof. One of ordinary skill in the art should understand which additives and an what concentration should be included in the treatment fluid for use in a desired method.

In some embodiments, the viscosified treatment fluids described herein (i.e., comprising an aqueous fluid, a based polymer, a BB crosslinking agent, optionally a plurality of particulates, and optionally additives) may be used in subterranean operations like drilling operations, stimulation treatments (e.g., fracturing treatments, acidizing treatments, or fracture acidizing treatments), and completion operations.

Some embodiments may involve drilling at least a portion of a wellbore penetrating a subterranean formation with a viscosified treatment fluid described herein.

Some embodiments may involve introducing a viscosified treatment fluid described herein into a wellbore penetrating a subterranean formation. In some embodiments, the viscosified treatment fluid may comprise a plurality of particulates and the method may involve forming a particulate pack in the wellbore, in the subterranean formation, or both (e.g., forming a gravel pack or forming a proppant pack).

In some embodiments, the viscosified treatment fluids described herein may be used in a fracturing operation. Some embodiments may involve introducing a first treatment fluid into a wellbore penetrating a subterranean formation at a pressure sufficient to create or extend at least one fracture in the subterranean formation; and forming a particulate pack in the fracture with a second treatment fluid that comprises a plurality of particulates. In some embodiments, the first treatment fluid, the second treatment fluid, or both may be viscosified as described herein (i.e., comprising a base polymer and a BB crosslinking agent). It should be noted that when both treatment fluids are viscosified as described herein, the composition of the first treatment fluid and the second treatment fluid may have the same or different components (e.g., the aqueous fluid, the base polymer, the BB crosslinking agent, and the like) and each component may independently be at the same or different concentrations in the two treatment fluids.

Some embodiments may further involve breaking the first and/or second treatment fluids. Breaking may be achieved by including a breaker in the treatment fluid or contacting the treatment fluid with a breaking treatment fluid. Some embodiments may further involve contacting the first and/or second treatment fluids with a breaking treatment fluid so as to reduce the viscosity of the treatment fluid. Breaking treatment fluids may comprise breakers suitable for degrading the BB crosslinking agents described herein. Examples of breakers may include, but are not limited to, acids.

In some embodiments, the viscosified treatment fluids described herein may be used in a gravel packing operation. Some embodiments may involve introducing a viscosified treatment fluid comprising an aqueous fluid, a base polymer, a BB crosslinking agent, and a plurality of particulates into a wellbore penetrating a subterranean formation; and forming a gravel pack comprising the particulates in an annulus within the wellbore (e.g., an annulus between the wellbore and a screen). Some embodiments may further involve breaking the viscosified treatment fluid so as to reduce the viscosity of the viscosified treatment fluid.

In various embodiments, systems configured for delivering the treatment fluids described herein to a downhole location are described. In various embodiments, the systems can comprise a pump fluidly coupled to a tubular, the tubular containing a viscosified treatment fluid that includes an aqueous fluid, a base polymer, and a boronated biopolymer crosslinking agent, wherein the boronated biopolymer crosslinking agent comprises a biopolymer derivatized with a boronic acid, a boronate ester, or both.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the viscosified treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the viscosified treatment fluid to the high pressure pump. In such embodiments, the low pressure pump may "step up" the pressure of the viscosified treatment fluid before it reaches the high pressure pump.

In some embodiments, the systems described herein can further comprise a mixing tank that is upstream of the pump and in which the viscosified treatment fluid is formulated. In various embodiments, the pump (e.g., a low pressure pump, a high pressure pump, or a combination thereof) may convey the viscosified treatment fluid from the mixing tank or other source of the viscosified treatment fluid to the tubular. In other embodiments, however, the viscosified treatment fluid can be formulated offsite and transported to a worksite, in which case the viscosified treatment fluid may be introduced to the tubular via the pump directly from its shipping container (e.g., a truck, a railcar, a barge, or the like) or from a transport pipeline. In either case, the viscosified treatment fluid may be drawn into the pump, elevated to an appropriate pressure, and then introduced into the tubular for delivery downhole.

Figure 3:
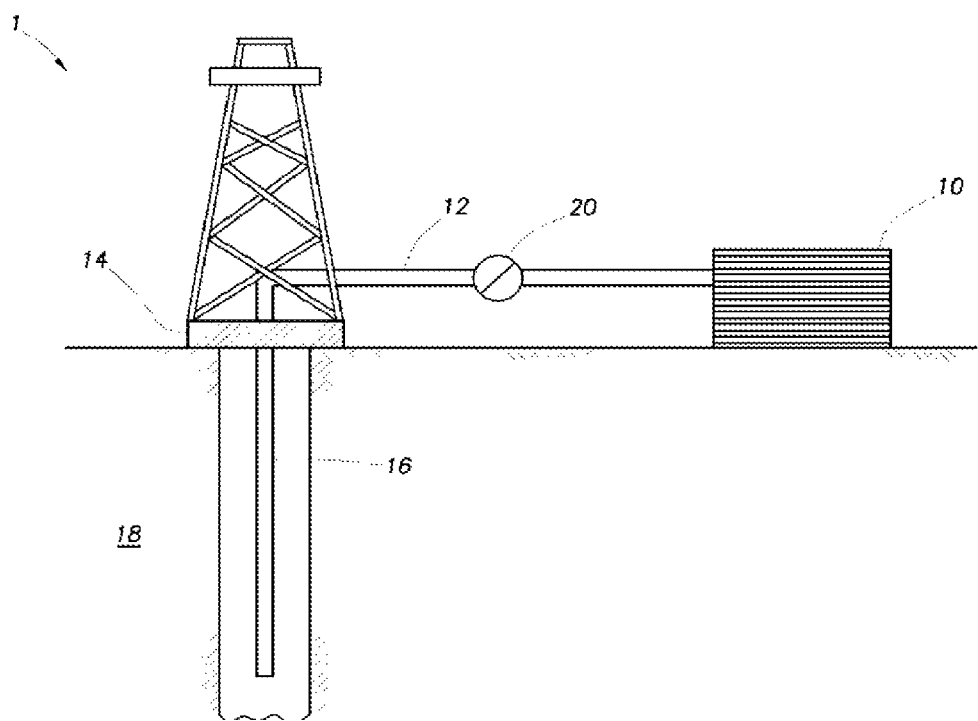
FIG. 3 shows an illustrative schematic of a system that can deliver treatment fluids of the present invention to a downhole location.

FIG. 3 shows an illustrative schematic of a system that can deliver viscosified treatment fluids of the present invention to a downhole location, according to one or more embodiments. It should be noted that while FIG. 3 generally depicts a land-based system, it is to be recognized that like systems may be operated in subsea locations as well. As depicted in FIG. 3, system 1 may include mixing tank 10, in which a viscosified treatment fluid of the present invention may be formulated. The viscosified treatment fluid may be conveyed via line 12 to wellhead 14, where the viscosified treatment fluid enters tubular 16, tubular 16 extending from wellhead 14 into subterranean formation 18. Upon being ejected from tubular 16, the viscosified treatment fluid may subsequently penetrate into subterranean formation 18. Pump 20 may be configured to raise the pressure of the viscosified treatment fluid to a desired degree before its introduction into tubular 16. It is to be recognized that system 1 is merely exemplary in nature and various additional components may be present that have not necessarily been depicted in FIG. 3 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

Although not depicted in FIG. 3, the viscosified treatment fluid may, in some embodiments, flow back to wellhead 14 and exit subterranean formation 18. In some embodiments, the viscosified treatment fluid that has flowed back to wellhead 14 may subsequently be recovered and recirculated to subterranean formation 18.

It is also to be recognized that the disclosed viscosified treatment fluids may also directly or indirectly affect the various downhole equipment and tools that may come into contact with the viscosified treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 3.

Embodiments disclosed herein include (A) a viscosified treatment fluids that includes an aqueous fluid, a base polymer, and a boronated biopolymer crosslinking agent, wherein the boronated biopolymer crosslinking agent comprises a biopolymer derivatized with a boronic acid, a boronate ester, or both.

Additional embodiments may include embodiment A with one or more of the following additional elements in any combination: Element 1: the base polymer comprising a natural polymer selected from the group consisting of guar, a guar derivative, hydroxypropylguar, oxidized guar, carboxymethylhydroxypropylguar, carboxymethyl guar, hydrophobically modified guar derivative, locust bean gum, a locust bean gum derivative, fenugreek gum, a fenugreek gum derivative, tara gum, a tara gum derivative, and any combination thereof; Element 2: the base polymer comprising a synthetic polymer selected from the group consisting of a polyol, a polyvinyl alcohol, a polymer comprising a monomer having a 1,4 diol substitution, a polymer comprising a monomer having a 1,3 diol substitution, a polymer comprising a monomer having a 1,2 diol substitution, and any combination thereof; Element 3: the base polymer having a molecular weight of about 100,000 g/mol to about 5,000,000 g/mol; Element 4: the base polymer being present at about 0.1% to about 10% by weight of the viscosified treatment fluid; Element 5: the biopolymer comprising at least one selected from the group consisting of a guar gum, oxidized guar, hydroxyethyl guar, hydroxypropyl guar, carboxymethyl guar, carboxymethylhydroxyethyl guar, carboxymethylhydroxypropyl guar, a cellulose, a cellulose derivative selected from hydroxyethyl cellulose, carboxyethylcellulose, carboxymethylcellulose, carboxymethylhydroxyethylcellulose, methyl cellulose, ethylcellulose, methylhydroxyethyl cellulose, xanthan, scleroglucan, succinoglycan, diutan, an alginate, a pectinate, chitosan, a hyaluronic acid, a polysaccharide, a polypeptide, and any combination thereof; Element 6: the boronated biopolymer crosslinking agent having a molecular weight of about 1,000 g/mol to about 5,000,000 g/mol; Element 7: the boronic acid or boronate ester having a general structure according to Formula I above, wherein R may be an alkylene, alkenyl, aryl, aralkyl, alkylaryl, alicyclic, or heteroaryl group containing 1 to 12 carbons, X may be a functional group capable of reacting with a functional group of the biopolymer, and $R_1$ and $R_2$ may independently be H or alkylene, alkenyl, aryl, aralkyl, alkylaryl, alicyclic, or heteroaryl groups containing 1 to 12 carbons; Element 8: the boronic acid or boronate ester comprising at least one selected from the group consisting of bromopentyl boronic acid, chloromethylvinyl boronic acid, 4-cyanopheylboronic acid, aminophenyl boronic acid and its salts with mineral or organic acid, esters with pinacol, formylphenyl bornic acids, carboxyphenyl borornic acids, bromomethyl boronic acid, alkoxycarbonyl bornic acids, boronate esters such as bromopropyl ester, formylphenyl boronic acid pinacol ester, and the like, and any combination thereof; Element 9: the boronated biopolymer crosslinking agent having a boron weight percent of about 0.005% to about 0.05% by weight of the boronated biopolymer crosslinking agent; Element 10: the boronated biopolymer crosslinking agent having a molar ratio of boron to monomeric units in the biopolymer of about 1:20 to about 1:1; Element 11: the boronated biopolymer crosslinking agent being present at about 0.005% to about 5% by weight of the viscosified treatment fluid; Element 12: the base polymer being guar, the biopolymer being carboxymethylcellulose, and the boronic acid being aminophenyl boronic acid; and Element 13: the treatment fluid being an invert emulsion.

By way of non-limiting example, exemplary combinations applicable to Embodiment A include: Element 1 in combination with Element 5; Element 2 in combination with Element 5; at least two of Elements 7-10 in combination; Element 1 in combination with Element 5 and at least one of Elements 7-10; Element 2 in combination with Element 5 and at least one of Elements 7-10; at least one of Elements 3, 4, and 11 in combination with any of the foregoing; Element 12 in combination with at least one of Elements 3, 4, 9, 10, and 11; Element 13 in combination with any of the foregoing; and so on.

Embodiments disclosed herein also include:

B. a method that includes introducing a viscosified treatment fluid according to Embodiment A (or variations thereof with the Elements described herein) into a wellbore penetrating a subterranean formation; and C. introducing a first treatment fluid into a wellbore penetrating a subterranean formation at a pressure sufficient to create or extend at least one fracture in the subterranean formation; and forming a particulate pack in the fracture with a second treatment fluid according to Embodiment A (or variations thereof with the Elements described herein) and further comprising a plurality of particulates.

Additional embodiments may include Embodiment B with one or more of the following additional elements in any suitable combination: Element 14: wherein introducing is at a pressure sufficient to create or extend at least one fracture in the subterranean formation; Element 15: drilling at least a portion of the wellbore with the viscosified treatment fluid; Element 16: wherein the viscosified treatment fluid further comprises a plurality of particulates; and the method further comprises forming a gravel pack comprising the particulates in an annulus within the wellbore; and Element 17: breaking the viscosified treatment fluid so as to reduce the viscosity of the viscosified treatment fluid. By way of non-limiting example, exemplary combinations applicable to Embodiment B include: Element 17 in combination with any of Elements 14-16.

Additional embodiments may include Embodiment C with one or more of the following additional elements in any suitable combination: Element 18: breaking the second treatment fluid so as to reduce the viscosity of the second treatment fluid.

To facilitate a better understanding of the present invention, the following examples of preferred or representative embodiments are given. In no way should the following examples be read to limit, or to define, the scope of the invention.

Examples

Two BB crosslinking agents were prepared by reacting carboxymethylcellulose (CMC) of two different molecular weights (700,000 g/mol and 250,000 g/mol) with aminophenyl boronic acid in the presence of a coupling agent. The coupling agent used was N-(3-dimethylaminopropyl)-N'-ethylcarbodiimide hydrochloride (EDC) or N,N'-dicyclohexylcarbodiimide (DCC). Underivatized CMC with a molecular weight of 700,000 mixed with (not coupled to) aminophenyl boronic acid was used as a control.

A viscosified fluid was produced by mixing hydrated BB crosslinking agent and hydrated guar, each at 10 pounds per gallon (ppg) in the final mixture, and then raising the pH to about 8. The viscosified fluid was tested at 90° F. using Chandler 5550 rheometer at a shear rate of 40 $sec^{-1}$, results shown in FIG. 1. The two derivatized CMC provided viscosities over 300 cP for two hours as 90° F. Further, of the two derivatized CMC, the higher molecular weight CMC provided a higher viscosity (above about 450 cP) versus the lower molecular weight CMC, which dropped from about 400 cP to sustaining about 300 cP. Visually, the viscosified fluids with the BB crosslinking agents were well viscosified with a lipping character of about 1.5" to about 2".

This example demonstrates that boronated CMC is an effective crosslinking agent for guar and may be suitable for use in wellbore operations (e.g., fracturing operations that utilize viscosified fluids for suspending and transporting particulates such as proppants). The results also indicate that a CMC with higher molecular weight will provide higher viscosities.

A control experiment was performed with two samples of 15 ppg and 20 ppg guar solutions crosslinked with sodium pentaborate (i.e., not a BB crosslinking agent described herein but rather a conventional borate crosslinker).

Figure 2:
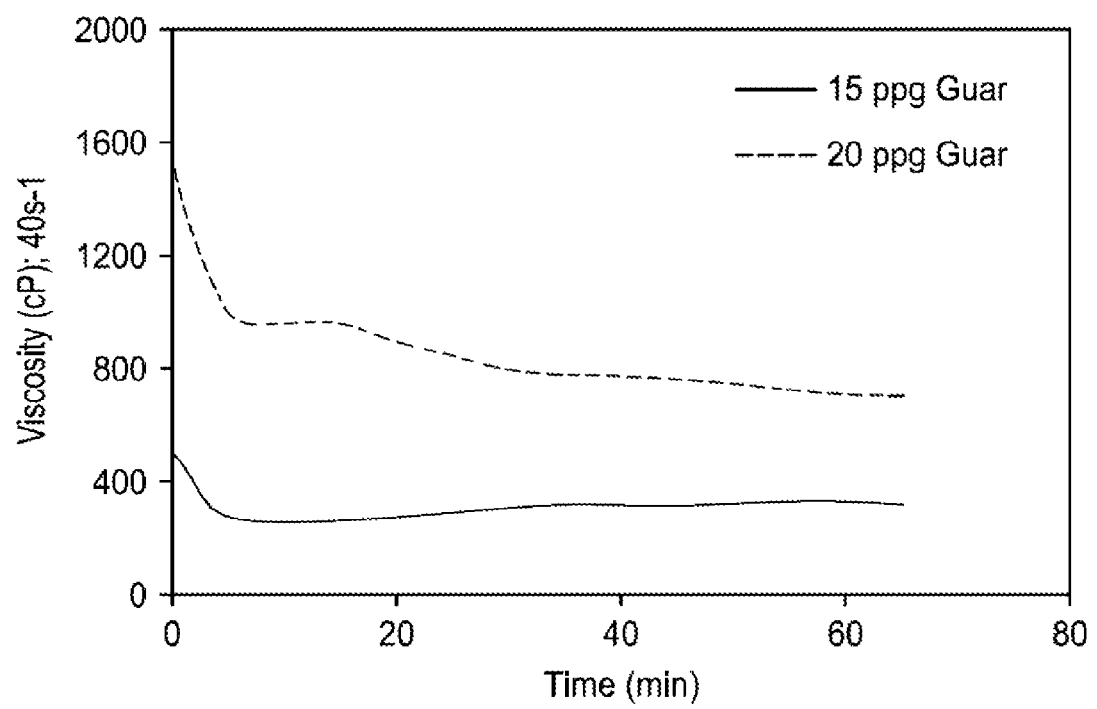
FIG. 2 is a viscosity profile of control treatment fluids utilizing traditional boron-containing crosslinking agents.

The viscosity of the two control samples was measured at 90° F. over 1 hour at a shear rate of 40 $sec^{-1}$. The results are presented in FIG. 2 where the 15 ppg sample has a viscosity of about 400 cP and the 20 ppg guar a viscosity that decreases to about 800 cP.

The viscosities demonstrated with the BB crosslinking agent above are commensurate with the viscosities achieved with conventional borate crosslinking systems at a 33% reduced base polymer concentration. Therefore, it is apparent that by using a BB crosslinking agent described herein with a derivatized biopolymer of suitable molecular weight and optimum level of boronate substitution, a reduction in the range of 25-50% the amount of base polymer can be achieved.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
introducing a viscosified treatment fluid into a wellbore penetrating a subterranean formation, the viscosified treatment fluid comprising an aqueous fluid, a base polymer, and a boronated biopolymer crosslinking agent,
wherein the boronated biopolymer crosslinking agent consists of a biopolymer derivatized with a boronic acid, a boronate ester, or both formed by reacting the biopolymer and the boronic acid, the boronate ester, or both in the presence of a coupling agent selected from the group consisting of N-(3-dimethylaminopropyl)-N'-ethylcarbodiimide hydrochloride (EDC) and N,N'-dicyclohexylcarbodiimide (DCC),
wherein the biopolymer is selected from the group consisting of guar gum, oxidized guar, hydroxyethyl guar, hydroxypropyl guar, carboxymethyl guar, carboxymethylhydroxvethyl guar, carboxymethylhydroxypropyl guar, a cellulose, a cellulose derivative selected from hydroxyethyl cellulose, carboxyethylcellulose, carboxymethylcellulose, carboxymethylhydroxvethylcellulose, methyl cellulose, ethylcellulose, methylhydroxyethyl cellulose, xanthan, scleroglucan, succinoglycan, diutan, an alginate, a pectinate, chitosan, a hyaluronic acid, a polysaccharide, a polypeptide, and any combination thereof,
wherein the boronic acid or boronate ester is selected from the group consisting of bromopentyl boronic acid, chloromethylvinyl boronic acid, 4-cyano- phenylboronic acid, esters with pinacol, formylphenyl boronic acids, carboxyphenyl boronic acids, bromomethyl boronic acid, alkoxycarbonyl boronic acids, formylphenyl boronic acid pinacol ester, and any combination thereof, and wherein the boronated biopolymer crosslinking agent in the viscosified treatment fluid requires about 25% to about 50% lower base polymer concentration to produce the same viscosity as a viscosified treatment fluid comprising the same base polymer and sodium pentaborate crosslinking agent.

2. The method of claim 1, wherein the base polymer a natural polymer selected from the group consisting of guar, a guar derivative, hydroxypropylguar, oxidized guar, carboxymethylhydroxypropylguar, carboxymethyl guar, hydrophobically modified guar derivative, locust bean gum, a locust bean gum derivative, fenugreek gum, a fenugreek gum derivative, tara gum, a tara gum derivative, and any combination thereof.

3. The method of claim 1, wherein the base polymer comprises a synthetic polymer selected from the group consisting of a polyol, a polyvinyl alcohol, a polymer comprising a monomer having a 1,4 diol substitution, a polymer comprising a monomer having a 1,3 diol substitution, a polymer comprising a monomer having a 1,2 diol substitution, and any combination thereof.

4. The method of claim 1, wherein the base polymer has a molecular weight of about 100,000 g/mol to about 5,000,000 g/mol.

5. The method of claim 1, wherein the base polymer is at about 0.1% to about 10% by weight of the viscosified treatment fluid.

6. The method of claim 1, wherein the boronated biopolymer crosslinking agent has a molecular weight of about 1,000 g/mol to about 5,000,000 g/mol.

7. The method of claim 1, wherein the boronated biopolymer crosslinking agent has a boron weight percent of about 0.005% to about 0.05% by weight of the boronated biopolymer crosslinking agent.

8. The method of claim 1, wherein the boronated biopolymer crosslinking agent and the base polymer are each at about 10 lb/gal in the viscosified treatment fluid.

9. The method of claim 1, wherein the treatment fluid is an invert emulsion.

10. The method of claim 1, wherein introducing is at a pressure sufficient to create or extend at least one fracture in the subterranean formation.

11. The method of claim 1 further comprising:
drilling at least a portion of the wellbore with the viscosified treatment fluid.

12. The method of claim 1, wherein the viscosified treatment fluid further comprises a plurality of particulates; and the method further comprises forming a gravel pack comprising the particulates in an annulus within the wellbore.

13. The method of claim 1 further comprising:
breaking the viscosified treatment fluid so as to reduce the viscosity of the viscosified treatment fluid.

14. A method comprising:
introducing a first treatment fluid into a wellbore penetrating a subterranean formation at a pressure sufficient to create or extend at least one fracture in the subterranean formation; and
forming a particulate pack in the fracture with a second treatment fluid, the second treatment fluid comprising an aqueous fluid, a base polymer, a boronated biopolymer crosslinking agent, and a plurality of particulates,
wherein the boronated biopolymer crosslinking agent consists of a biopolymer derivatized with a boronic acid, a boronate ester, or both by reacting the biopolymer and the boronic acid, the boronate ester or both in the presence of a coupling agent selected from the group consisting of N-(3-dimethylaminopropyl)-N'-ethylcarbodiimide hydrochloride (EDC) and N,N'-dicyclohexylcarbodiimide (DCC),
wherein the biopolymer is selected from the group consisting of guar gum, oxidized guar, hydroxyethyl guar, hydroxypropyl guar, carboxymethyl guar, carboxymethylhydroxyethyl guar, carboxymethylhydroxypropyl guar, a cellulose, a cellulose derivative selected from hydroxyethyl cellulose, carboxyethylcellulose, carboxymethylcellulose, carboxymethylhydroxyethylcellulose, methyl cellulose, ethylcellulose, methylhydroxyethyl cellulose, xanthan, scleroglucan, succinoglycan, diutan, an alginate, a pectinate, chitosan, a hyaluronic acid, a polysaccharide, a polypeptide, and any combination thereof,
wherein the boronic acid or boronate ester is selected from the group consisting of bromopentyl boronic acid, chloromethylvinyl boronic acid, 4-cyanophenylboronic acid, esters with pinacol, formylphenyl boronic acids, carboxyphenyl boronic acids, bromomethyl boronic acid, alkoxycarbonyl boronic acids, formylphenyl boronic acid pinacol ester, and any combination thereof, and
wherein the boronated biopolymer crosslinking agent in the viscosified treatment fluid requires about 25% to about 50% lower base polymer concentration to produce the same viscosity as a viscosified treatment fluid comprising the same base polymer and sodium pentaborate crosslinking agent.

15. The method of claim 14 further comprising:
breaking the second treatment fluid so as to reduce the viscosity of the second treatment fluid.

* * * * *

UNITED STATES PATENT AND TRADEMARK OFFICE
CERTIFICATE OF CORRECTION

PATENT NO. : 9,688,906 B2
APPLICATION NO. : 14/362605
DATED : June 27, 2017
INVENTOR(S) : Dipti Singh et al.

Page 1 of 1

It is certified that error appears in the above-identified patent and that said Letters Patent is hereby corrected as shown below:

On the Title Page

Item (73) Assignee should read --Halliburton Energy Services, Inc.-- rather than "Halliburton Energy Sevics, Inc."

Signed and Sealed this
Tenth Day of April, 2018

Andrei Iancu
*Director of the United States Patent and Trademark Office*